US010926308B2

(12) United States Patent
Yost

(10) Patent No.: US 10,926,308 B2
(45) Date of Patent: Feb. 23, 2021

(54) METHOD AND REAGENT SYSTEM FOR TREATING MERCURY-CONTAMINATED MATERIAL

(71) Applicant: HMR Solutions, Inc., Brooklyn, NY (US)

(72) Inventor: Karl William Yost, Anacortes, WA (US)

(73) Assignee: HMR Solutions, Inc., Brooklyn, NY (US)

( * ) Notice: Subject to any disclaimer, the term of this patent is extended or adjusted under 35 U.S.C. 154(b) by 126 days.

(21) Appl. No.: 16/140,102

(22) Filed: Sep. 24, 2018

(65) Prior Publication Data

US 2019/0091740 A1 Mar. 28, 2019

Related U.S. Application Data

(60) Provisional application No. 62/562,257, filed on Sep. 22, 2017.

(51) Int. Cl.
| | |
|---|---|
| *B09C 1/00* | (2006.01) |
| *B09C 1/08* | (2006.01) |
| *A62D 3/30* | (2007.01) |
| *B09C 1/02* | (2006.01) |
| *A62D 101/24* | (2007.01) |

(52) U.S. Cl.
CPC ............... *B09C 1/08* (2013.01); *A62D 3/30* (2013.01); *A62D 2101/24* (2013.01); *B09C 1/02* (2013.01); *B09C 2101/00* (2013.01)

(58) Field of Classification Search
CPC .. A62D 2101/24; A62D 2101/43; A62D 3/30; B09C 1/08
See application file for complete search history.

(56) References Cited

U.S. PATENT DOCUMENTS

| | | | |
|---|---|---|---|
| 4,147,626 A | 4/1979 | Findlay | |
| 5,034,054 A | 7/1991 | Woodward | |
| 5,226,545 A | 7/1993 | Foust | |
| 5,314,527 A | 5/1994 | Rockandel | |
| 5,397,478 A | 3/1995 | Pal | |
| 5,536,899 A | 7/1996 | Forrester | |
| 5,877,393 A * | 3/1999 | Webster | A62D 3/33 |
| | | | 405/128.75 |
| 5,898,093 A | 4/1999 | Vos | |
| 6,258,018 B1 | 7/2001 | Pal | |
| 6,309,337 B1 | 10/2001 | Pal | |
| 6,475,451 B1 | 11/2002 | Leppin | |
| 6,635,796 B2 | 10/2003 | Pal | |
| 6,838,504 B1 | 1/2005 | Webster | |
| 6,911,570 B2 | 6/2005 | Broderick | |
| 7,208,457 B2 | 4/2007 | Hurley | |
| 7,407,602 B2 | 8/2008 | Hurley | |
| 7,670,576 B2 | 3/2010 | Chisick | |
| 7,771,683 B2 | 8/2010 | Hurley | |
| 2006/0102557 A1 | 5/2006 | Hurley | |
| 2007/0010701 A1 * | 1/2007 | Forrester | B09B 3/0033 |
| | | | 588/256 |
| 2009/0148368 A1 | 6/2009 | Hurley | |
| 2009/0202407 A1 | 8/2009 | Hurley | |
| 2010/0150657 A1 | 6/2010 | Ball | |
| 2012/0276615 A1 * | 11/2012 | Seeger Pfeiffer | C12R 1/01 |
| | | | 435/252.3 |

FOREIGN PATENT DOCUMENTS

| | | |
|---|---|---|
| CN | 104403675 B | 12/2017 |
| WO | 2008008475 A2 | 1/2008 |

OTHER PUBLICATIONS

Hagermann, "Technologies for the Stablization of Elemental Mercury-Containing Wastes," Gesellschaft fur Anlagen-und Reaktorsicherheit mbH. Oct. 2009.
Kalb, Adams, Milian, Sulfur Polymer Stabilization/Solidification (SPSS) Treatment of Mixed-Waste Mercury Recovered from Environmental Restoration Activities at BNL. Brookhaven National Laboratory, Environmental Sciences Department, USDOE. Jan. 2001.
Biester, Haralk and Zimmer, Hoger. "Solubility and Changes of Mercury Binding Forms in Contaminated Soils after Immobilization Treatment". Institute of Environmental Geochemistry, Heidelberg Germany. Environmental Science Technology, 32, 2756-2762. 1998.
Yost, Chisick, and Mueller, "Reduction of Radionuclide and Other Radioactive Substance Leachability from Ohio and New Jersey Soils Using an Innovative Chemical Treatment Process". 51st Annual Purdue Industriai Waste Conference. May 1996.
Science Applications International Corporation, "Technologies for Immobilizing High Mercury Subcategory Wastes". EPA Contract No. 68-W4-0005, SAIC Protect No. 06-6312-08-5226-002. Jul. 17, 1998.
Capsule Report, "Aqueous Mercury Treatment," Office of Research and Development U.S. EPA, Washington, DC, EPA/625.R-97/004, Jul. 1997.
Clever, H.L., Johnson, S.A., and Derrick, M.E., "The Solubility of Mercury and Some Sparingly Solube Mercury Salts in Water and Aqueous Electrolyte Solutions," J. Phys.Chem. Ref. Data, 14(3), 631-680, 1985.
Piao, Haishan, "Stabilization of Mercury-containing Wastes Using Sulfide," Ph.D. dissertation submitted to the: Division of Research and Advanced Studies of the University of Cincinnati, Department of Civil and Environmental Engineering of the College of Engineering. 2003. Elsevier/Science Direct: Environmental Pollution 139 (2006) 498-506.

(Continued)

*Primary Examiner* — Janine M Kreck
(74) *Attorney, Agent, or Firm* — John D. Carpenter, Esq.

(57) ABSTRACT

A method of treating mercury-contaminated material to obtain a treated product having reduced mercury leachability includes the steps of (a) admixing the mercury-contaminated material with a reagent system comprising calcium sulfide (CaS) and trisodium phosphate (TNaP), wherein the calcium sulfide and trisodium phosphate are preferably provided at a CaS:TNaP ratio of from 2:1 to 1:2, on a dry weight reagent basis, and the reagent system is preferably provided in an amount equal to 0.4% to 5% by weight of the contaminated material; and (b) adding water as needed to achieve a moisture content of at least 5% by weight of the contaminated material.

21 Claims, No Drawings

(56) References Cited

OTHER PUBLICATIONS

Yost, Pal, Chisick, and Jesernig, "Lead and Other Heavy Metal Fixation in Soils and Solid Waste by the MAECTITE® Chemical Treatment Process". 49th Annual Purdue Industrial Waste Conference, May 1994.
Jay, Jenny Ayal, et. al., "Mercury Methylation by Desulfovibrio desulfuricans ND132 in the Presence of Polysulfides". Applied and Environmental Microbiology, Nov. 2002 p. 5741-5745. American Society of Microbiology. 2002.
MSE Technology Applications, Inc. "Draft Report—Treatability Studies for Mercury-Contaminated Soil at the Y-12 Plant, Bldg. 81-10 Area, Oak Ridge, TN". US Department of Energy, National Energy Technology Laboratory, Pittsburgh, PA. Contract No. DE-AC22-96EW96405. Mar. 2003.
MSE Technology Applications, Inc. Draft Final Report—A Test Program for In Situ Stabilization of Mercury-Contaminated Soil. US Department of Energy, Savannah River Operations Office, Aiken, SC. Contract No. DE-AC22-09EW96405. Nov. 2004.
Bower, Julia. "Immobilization of Mercury using Iron Sulfide Minerals". Masters Degree Thesis, Auburn, AL. Aug. 2007.
United States Patent and Trademark Office, as the ISA/U.S.: "International Search Report," "Written Opinion," and "Notification of Transmittal" of same, for PCT/US/2018/052489, dated Dec. 6, 2018.
ALS Global, "US EPA Method 1311—Toxicity Characteristic Leaching Procedure (TCLP)," Apr. 2011, p. 1 (cited in ISR/WO for PCT/US/2018/052489).

\* cited by examiner

METHOD AND REAGENT SYSTEM FOR TREATING MERCURY-CONTAMINATED MATERIAL

CROSS-REFERENCE TO RELATED APPLICATION

This application claims the benefit of U.S. provisional patent application No. 62/562,257, filed Sep. 22, 2017, the entire contents of which are incorporated herein by this reference.

FIELD OF THE INVENTION

The invention relates to methods for remediating mercury-contaminated soil and waste.

BACKGROUND OF THE INVENTION

With the expanding world-wide regulatory ban on the use, import, and export of mercury and its compounds—ionic as well as covalent—and waste materials that contain mercury, there exists a substantial need for a simple but effective method for converting mercury found in soil, sediments, ore residues, and other mercury concentrates, solid wastes, debris, etc. to chemically stable forms suitable for long-term disposal. In recent years, many management approaches to mercury and mercury-bearing materials have focused on recovery and recycling of mercury in its elemental form, using retort and other thermal means. Unfortunately, these recovery options are not viable for many situations, both from the perspectives of cost and efficacy, and toxicity to humans and the environment. Although regulations governing the reuse of elemental mercury have become increasingly stringent and manufacturers have shifted to other more environmentally sound, less toxic options, numerous contaminated sites remain untreated. In addition, new sources of mercury contamination are likely to be identified that require remedial cleanup. Accordingly, there remains a need for safe and effective methods for addressing the management and disposal of historic mercury contamination found in soil, solids, and other materials, and new contaminated sites as they are identified in the near future. Tins invention converts mercury in its elemental and other forms into a chemically stable state of reduced solubility and leachability for safe, low-cost disposal via internment.

Over the years, much attention has been paid to the treatment of mercury in soil, solid waste, and other materials. These technologies have relied upon recovery of mercury using retort or other thermal processes, or various chemical techniques. Examples include mixing the contaminated material with sulfur and calcium-based sulfides, controlling pH using calcium (and/or magnesium) alkaline earth agents, and introducing calcium-based-phosphate and phosphate salt additives to mitigate iron issues. Other techniques for remediating mercury contaminants include the use of less effective polysulfide, other heavy metals to help complex formation, and oxidation/reduction reaction drivers to convert mercury to more or less reactive forms for scavenging or other recovery or capture methods.

While prior approaches to mercury remediation may be effective in some situations, they have a number of drawbacks. For example, thermal methods generate elemental mercury with severe reuse/disposal options and significant energy requirements. Some chemical techniques expand the end-product treated mass and volume by the incorporation of hydrated water and the amounts of solid reagent and water added. Some techniques utilize absorbents, adsorbents, phosphate-bonded ceramics, or other specific resins to physically retain soluble mercury within the additive matrix or media component, and as such are quite complex. And some of the chemical techniques require the addition of three or more reagents to control: mercury solubility; interferences from various species (e.g., iron) found in the waste material or soil; and pH in the neutral to alkaline range, using lime, calcium-based hydroxides or carbonates.

The mercury remediation method of the present invention forms mercury sulfides and metallic phosphates of reduced solubility and leachability with the addition of calcium sulfide and Trisodium phosphate (TNaP). When TNaP enters solution with water, sodium ions are released that do not react with sulfide to compete with mercury sulfide reactions, unlike the calcium provided by calcium-based phosphate reagents. TNaP also forms hydroxide in the presence of water, which facilitates overall reaction pH in the alkaline range to prevent loss of sulfide as hydrogen sulfide. This avoids a substantial health risk ($H_2S$ is toxic), and ensures that an appropriate quantity of sulfide is available to react with mercury to form virtually insoluble mercury sulfide. Also of importance, the invention's reagents do not cause water hydration of the treatment reactants or end-product mass. Hydration reactions with cement and other pozzolans not only detrimentally incorporate water mass into the treated end-product, but they generate heat, and mercury is easily volatilized from solid and water materials to extremely toxic vapor forms at even slightly elevated temperatures.

The Patent literature describes a number of approaches for remediating mercury. U.S. Pat. No. 4,147,626 addresses the Treatment of Mercury Contaminated Aqueous Media where calcium polysulfide is used to react with elemental mercury to form mercury sulfide. U.S. Pat. No. 5,034,054 specifies a Process for Treating Mercury in Preparation for Disposal by treating elemental mercury using metallic powders such as copper, nickel, zinc, or sulfur to form a solidified mass where mercury is absorbed to the elemental surfaces of the added metals. U.S. Pat. No. 5,226,545 calls for the Extraction of Mercury and Mercury Compounds from Contaminated Material and Solutions and removal of mercury from host matrix using an oxidant and iodine based additives. U.S. Pat. No. 5,314,527 treats Mercury Contaminated Mud using a hydrometallurgical method that includes providing an acid and sodium hypochlorite through a series of treatment processing steps and thickening the material to extract mercury from US EPA listed K106 waste derived from mercury chlor-alkali plants. U.S. Pat. No. 5,397,478 relates to the fixation and stabilization of chromium in contaminated materials. U.S. Pat. No. 5,536,899 teaches the use of a complexing agent of aluminum or iron, chloride, and preferably phosphoric acid, or a variety of other water soluble phosphoric acid salts containing phosphates for the treatment of lead, where one type of phosphate salt is Trisodium phosphate. However, the inclusion of calcium sulfide is not taught, nor is the treatment of elemental or other mercury forms. U.S. Pat. No. 5,877,393 describes a Treatment Process for Contaminated Waste containing metals that teaches the necessary use of three (3) reagents that include calcium sulfide, an inorganic phosphate selected from various calcium phosphate forms, and calcium hydroxide, calcium carbonate, or calcium oxide and or mixtures of calcium-based pH control components to render toxic metals harmless. The invention uses calcium phosphate to prevent remobilization of the contaminating metal such as iron and other metals with various oxidation-reduction valence. U.S.

Pat. No. 5,898,093 is a Treatment Process for Contaminated Waste that teaches the use of three (3) reagents including calcium sulfide or calcium polysulfide, calcium phosphate, and calcium carbonate to treat leachable toxic heavy metals, and in particular, lead in solids and soil. Calcium phosphate is provided to react with ferric iron to prevent a redox potential that will oxidize metallic sulfide. The preferred calcium phosphate is calcium hydrogen phosphate. To supplement basic pH requirements, calcium oxide is recommended. U.S. Pat. No. 6,258,018 causes Fixation and Stabilization of Metals in contaminated soils and materials using phosphoric acid and sulfate and does not resolve mercury treatment or prescribe sulfide use. U.S. Pat. No. 6,309,337 is a method like '018 for forming an insoluble phosphate mineral species using phosphoric acid and sulfate and does not teach mercury treatment or sulfide use. U.S. Pat. No. 6,475,451 addresses Mercury Removal from Gaseous Process Streams using an oxidizer such as nitric acid to scavenge mercury for gaseous process streams. U.S. Pat. No. 6,635,796, like '018 and '337, provides a method for the reduction of leachability and solubility of radionuclides and radioactive substances in contaminated soils and materials using phosphoric acid and sulfate and does not teach treatment of mercury or sulfide use. U.S. Pat. No. 6,838,504 B1 is an Integrated Fixation Systems that teaches the use multiple reactants of polymeric matrices and films comprised of sulfides, phosphates and adsorbents to reduce leachability of heavy metals to produce insoluble metal compounds, and in particular, for the use in the manufacture of lead-acid batteries. U.S. Pat. No. 6,911,570 provides for a Method for Fixating Sludges and Soils Contaminated with Mercury and other Heavy Metals that teaches the use of a sulfur-containing compound such as sulfide, polysulfide, thiolcarbamates or mixtures, thereof, and the addition of iron-compounds and oxygen with agitation or sparging. U.S. Pat. No. 7,208,457 B2 is a Heavy Metal-Remediating Paint Stripper that uses more than two (2) reagents including calcium sulfide, calcium carbonate, and triple superphosphate mixed with soybean oil and N-methyl pyrrolidone to render heavy metals, primarily lead, insoluble when applied to heavy metal-based paint for its removal by the stripping invention. U.S. Pat. No. 7,407,602 provides a method for controlling air pollution for mercury and other pollutants where a combustion gas is passed through a slurry of an alkaline-earth metal sulfide and a redox buffering agent such as phosphate, and preferably with an alkaline-earth carbonate and/or hydroxide. The invention removes heavy metal from combustion gas where the composition of the slurry is provided as an aerosolized aqueous dispersion in a 20-50% (w/w) solids dispersion that can be applied to the combustion gas using a spray nozzle or rotary atomizer. U.S. Pat. No. 7,670,576 describes Methods of Treatment of Chromite Ore Processing Residue containing hexavalent chromium and teaches the use of providing oxygen scavengers and a chemical reducer to treat chromium using ferrous iron/ferrous sulfide. U.S. Pat. No. 7,771,683 expands on the '602 patent's disclosure by specifying the use of calcium and/or magnesium based alkaline-earth metal sulfides, hydroxides, carbonates, and phosphates.

Other Published Art-Related Literature includes Ahmad, Zaki, "Principles of Corrosion Engineering and Corrosion Control," Chapter 11—Boiler Corrosion, pp 576-608, Elsevier Ltd., 2006; Conner, Jesse R., "Chemical Fixation and Solidification of Hazardous Wastes", Van Nostrand Reinhold, NY, N.Y. (1990); Clever, H. L., Johnson, S. A., and Derrick, M. E., "The Solubility of Mercury and Some Sparingly Soluble Mercury Salts in Water and Aqueous Electrolyte Solutions," J. Phys. Chem. Ref. Data, 14(3), 631-680, 1985; Hagermann, "Technologies for the Stabilization of Elemental Mercury and Mercury-Containing Wastes," Gesellschaft fur Anlagen-und Reaktorsicherheit mbH. October 2009; Kalb, Adams, Milian, "Sulfur Polymer Stabilization/Solidification (SPSS) Treatment of Mixed-Waste Mercury Recovered from Environmental Restoration Activities at BNL. Brookhaven National Laboratory, Environmental Sciences Department, USDOE. January 2001; Piao, Haishan, "Stabilization of Mercury-containing Wastes Using Sulfide," Ph.D. dissertation submitted to the: Division of Research and Advanced Studies of the University of Cincinnati, Department of Civil and Environmental Engineering of the College of Engineering, 2003; Rodriquez, Padilla, Tayibi, and Lopez-Delagado, "Concerns on Liquid Mercury and Mercury-Containing Wastes: A Review of the Treatment Technologies the Safe Storage (of mercury). National Centre of Metallurgical Research, CENIM, CISC. Madrid, Spain; Yost, Pal, Chisick, and Jesernig, "Lead and Other Heavy Metal Fixation in Soils and Solid Waste by the MAECTITE® Chemical Treatment Process", $49^{th}$ Annual Purdue industrial Waste Conference, May 1994; U.S. EPA Capsule Report, "Aqueous Mercury Treatment," Office of Research and Development, Washington, D.C., EPA/625.R-97/004, July 1997; and Yost, Chisick, and Mueller, "Reduction of Radionuclide and Other Radioactive Substance Leachability from Ohio and New Jersey Soils Using an innovative Chemical Treatment Process". $51^{st}$ Annual Purdue Industrial Waste Conference. May 1996.

Notwithstanding the prior attempts to address mercury contamination in industry and the environment, there remains a need for safe and effective methods for treating historic mercury contamination found in soil, solids, and other materials, to safely dispose of recovered mercury, and to handle new contaminations as they occur or are identified in the near future.

SUMMARY OF THE INVENTION

The present invention provides a method for treating leachable elemental mercury and other mercury species in solids, soils, and other wastes using calcium sulfide (CaS) and Trisodium phosphate (TNaP; $Na_3PO_4$) in order to convert the mercury to less leachable forms and to bring the contaminated material into compliance with various statutes and regulations, including The Resource Conservation Recovery Act (42 U.S.C. § 6901 et seq.), Title 42 of the Code of Federal Regulations, and related United States Environmental Protection Agency (U.S. EPA) directives and guidelines relating to land disposal and waste management.

This invention converts mercury in its elemental and other forms to a chemically stable state of reduced solubility and leachability suitable for safe, low-cost disposal via internment. In particular, elemental, ionic, and organic mercury forms are preferentially and chemically converted by the invention reagents to highly insoluble forms stable to EPA test methods, including Method 1311 (Toxicity Characteristic Leaching Procedure—TCLP—Revision 0, 1992) and Method 1312 (Synthetic Precipitation Leaching Procedure—SPLP) for acid rain exposure. Unlike common physical binding technologies where mercury is solidified in a stabilized physical mass using cements, pozzolans, or other such geotechnical-based immobilization approaches, the present invention utilizes chemical bonding principles to generate mixed-mineral forms that are resistant to leaching from pH, landfill leachate constituents, and abrasive mechanisms associated with particle-to-particle contact encountered in waste handling, landfill internment, compaction, cover placements, and in situ "weathering" within the landfill. Physical mass dimension stability of material treated by this invention is not essential to the long-term chemical stability of the mercury forms in treated materials.

According to one aspect of the invention, a method of treating mercury-contaminated material to obtain a remediated product having reduced mercury leachability includes the steps of (a) admixing the mercury-contaminated material with a reagent system comprising calcium sulfide (CaS) and trisodium phosphate (TNaP), wherein the calcium sulfide and trisodium phosphate are provided at a CaS:TNaP ratio of from 2:1 to 1:2, on a dry weight reagent basis, and the reagent system is provided in an amount equal to 0.4% to 5% by weight of the contaminated material; and (b) adding water as needed to achieve a moisture content of at least 5% by weight of the contaminated material. The mercury-contaminated material can be provided as a dry solid, a moist solid having a moisture content of up to 60% by weight (for example, contaminated soil), a sediment, sludge, or slurry having a solids content of at least 5% by weight, or the material may have some other physical form or an aggregation of forms.

The addition of calcium sulfide (CaS) and trisodium phosphate ("TNaP", $Na_3PO_4$) to mercury-containing material will preferentially cause mercury to form precipitates of mercury sulfide of reduced solubility and leachability within the host solid matrix. The binary reagent system described herein has several advantages over the prior art, including ease of use, pH control, limited mass increase, reduced cost, the ability to optimize reagent dosing to treat soils and waste having varying degrees of mercury contamination, and most significantly the ability to meet the requirements for handling hazardous waste under the U.S. EPA RCRA Toxicity Rule for characteristically hazardous waste.

DETAILED DESCRIPTION

As provided by one aspect of the invention, the addition of calcium sulfide (CaS) and trisodium Phosphate ("TNaP", $Na_3PO_4$) to mercury-containing material will preferentially cause mercury to form precipitates of mercury sulfide of reduced solubility and leachability within the host solid matrix. Mercury leachability is measured using the U.S. EPA's SW-846 Test Methods for the Evaluation of Solid Waste, where solid materials are prepared using Test Method 1311 (TCLP—Toxicity Characteristic Leaching Procedure—Revision 0, 1992), and the resultant extract fluid is analyzed for total mercury. Under the U.S. EPA RCRA Toxicity Rule for characteristically hazardous waste, mercury concentrations in the extract greater than 0.2 mg/L classify the material as a characteristically hazardous waste. Mercury in TCLP extract at a concentration of greater than 0.025 mg/L fails to meet the U.S. EPA's Universal Treatment Standard for mercury in characteristically hazardous waste.

Each reagent is equally important to the reaction process. In general and without showing the speciation of mercury, the mercury-sulfide reactions of the technology stated simply are given in equations (1) and (2):

$$CaS + H_2O \rightarrow Ca(SH)(OH) \quad (1)$$

$$Ca(SH)(OH) + Hg + H_2O \rightarrow Ca(OH)_2 + HgS\downarrow. \quad (2)$$

The general disassociation reactions for TNaP in water include those shown in equations (3) and (4):

$$Na_3PO_4(s) \rightarrow 3Na^+(aq) + PO_4^{3-}(aq) \quad (3)$$

$$Na_3PO_4(s) + H_2O \rightarrow NaOH(aq) + Na_2HPO_4, \quad (4)$$

where calcium sulfide is a partially water soluble, solid reagent powder that supplies stable sulfide ions to the process; and where, trisodium phosphate (TNaP) is a highly water soluble solid that provides ionic phosphate and alkaline pH conditions when dissolved in water. When CaS and TNaP are properly combined and the reagents are admixed with a mercury-containing material (with water added as needed to raise the moisture content of the contaminated material to at least 5% by weight), the desired highly insoluble, non-leachable and stable mercury sulfide is preferentially formed.

The CaS and TNaP reagents can be added to the contaminated material in combination, or individually, with CaS added separately from TNaP. The reagents can be provided in dry form or, alternatively, either or both of the components of the reagents can be provided as an aqueous slurry. If the reagents are added as a slurry (or as individual slurries), the water contained therein can be sufficient to raise the moisture content of the contaminated material to the desired minimum of at least 5% water by weight.

Calcium has an affinity for sulfide, and CaS has a tendency to remain as a partially insoluble solid as provided in its reagent form. As shown in Table 1 below, the solubility product constant ($K_{sp}$) for CaS in water is $8.0 \times 10^6$ at 25° C. Calcium provided by the CaS reagent will tend to remain in its state bound to sulfide, thus reducing the availability of sulfide to react with mercury. (Similarly, any calcium present in the host waste material will tend to react with sulfide, further diminishing the availability of sulfide to react with mercury.) The present invention addresses this problem by including TNaP as a component of the reagent system.

When dissociated in water, TNaP provides reactive phosphate ions to form highly insoluble calcium phosphate, as shown in equation 5:

$$Ca^{+2} + PO_4^{-3} \rightarrow Ca_3(PO_4)_2\downarrow. \quad (5)$$

Calcium phosphate has a $K_{sp}$ of $2.07 \times 10^{-33}$ at 25° C. Phosphate ions released when the TNaP reagent is dissolved in water react preferentially with calcium. This effectively removes calcium from competing with mercury for sulfide, and allows free sulfide released from the CaS reagent to react preferentially with the mercury. Table 1 presents common solubility product constants that are widely published in the literature.

TABLE 1

Solubility Product Constants for CaS-TNaP Reagent-System Reagents, End-products, and Prior Art Reagents

| Compound | Ksp @ 25° C. | Comment |
|---|---|---|
| Mercury (II) sulfide | $6.44 \times 10^{-53}$ | Invention end product |
| Mercury (I) sulfide | $1.0 \times 10^{-47}$ | Invention end product |
| Calcium phosphate | $2.07 \times 10^{-33}$ | Invention end product/not added as invention reagent (or in similar salt forms) |
| Mercury (II) hydroxide | $3.60 \times 10^{-26}$ | Invention end product/unstable in presence of sulfide |
| Mercury (I) hydroxide | $3.13 \times 10^{-17}$ | Invention end product/unstable in presence of sulfide |
| Mercury (I) carbonate | $9.52 \times 10^{-15}$ | Carbonate not provided in present invention |
| Calcium carbonate | $4.96 \times 10^{-9}$ | Carbonate not provided in present invention |
| Calcium hydroxide | $4.68 \times 10^{-6}$ | Not provided as invention reagent/unstable in presence of phosphate in controlled alkaline condition |

TABLE 1-continued

Solubility Product Constants for CaS-TNaP Reagent-System
Reagents, End-products, and Prior Art Reagents

| Compound | Ksp @ 25° C. | Comment |
|---|---|---|
| Calcium sulfide | $8.0 \times 10^{-6}$ | Preferred invention reagent - not stable in presence of phosphate |
| Trisodium phosphate | WS | Preferred invention reagent - highly water soluble |
| Calcium polysulfide | WS | Invention reagent - highly water soluble/excessively elevates pH when additional sulfide is required |
| Mercury (I) phosphate | unknown | NC/NR |
| Mercury (II) phosphate | unknown | NC/NR |
| Mercury (II) carbonate | unknown | NC/NR |

WS - Water soluble
NC/NR - not common/not relevant or suspected in contaminated material It is well known that the lower the $K_{sp}$ value of a compound, the lower the solubility of that compound in water at the reported temperature. Of course, published $K_{sp}$ values are based on the use of high-purity compounds, with measurements obtained using highly controlled methodologies. In the real world of hazardous material sites, $K_{sp}$ constants can only be used as a reference when inferring leachability of these compounds from soil, solid materials, waste, and other media. Nevertheless, they do allow for some prediction as to the stability of reagents and end-products with respect to various conditions, characteristic, treatment, and extraction fluid-based test methods.

From the published $K_{sp}$ values, it is evident that the intended end-products of the described invention, in particular, mercury sulfides, have extremely low solubility in water. It is also evident that the reagents of the reagent system provided in this invention are very soluble relative to other prior art reagents and end-products, thus allowing for the invention reagents to efficiently react with problematic constituents as discussed herein. For example, calcium's high affinity for phosphate, as evidenced by the low solubility product of the formed compounds (calcium phosphate and related family salts) make calcium phosphate a poor choice for a reagent for the remediation of mercury. The calcium ions and phosphate ions in such systems are effectively combined and therefore, removed from competing with the mercury and sulfide reactions that form mercury-sulfide end-products. This problem is avoided by the present invention, which uses trisodium phosphate in combination with calcium sulfide where the provided phosphate preferentially reacts with and binds the calcium from the CaS, and the sulfide is released to react with mercury.

Additionally, TNaP readily forms an alkaline solution with water. This feature of the specific phosphate reagent is important to the mercury-sulfide reaction end-product. It enhances controlled, non-mercury metallic-hydroxide formation and prevent the formation of acidic conditions that are conducive to the generation and release of toxic hydrogen sulfide gas from the sulfide provided by the binary reagent system. The highly soluble TNaP releases phosphate ions when in solution, and these ions will react with other non-mercury heavy metals, but in particular, calcium. If the phosphate containing reagent were provided in the form of tricalcium phosphate, Triple Superphosphate, phosphate rock, or c forms from this family of phosphate salts, the reactants would not readily allow release of phosphate ions to react with calcium from the calcium sulfide. And, if phosphate is added in an acidic form, for example phosphoric acid, or under acidic conditions, the formation of hydrogen sulfide gas released from the CaS would render the system unsafe for use and release sulfide ions that would otherwise be available to react with mercury.

Prior art efforts to remediate mercury using calcium sulfide and a phosphate source teach that the addition of lime, hydroxide, or other alkaline additives or buffering compounds such as calcium carbonate are also required as separate reagents to elevate or otherwise control pH. The TNaP disclosed in this process accomplishes controlled pH adjustment without the need of an exogenous source of hydroxide ion. Furthermore, the disclosed reagent system effectively treats leachable mercury without causing overly alkaline conditions that facilitate the formation of soluble mercury sulfide complexes/bisulfide forms (e.g. $HgHS^{2-}$, $HgS(H_2S)^{2-}$, $Hg(HS)^{3-}$, and/or $HgS(HS)^{2-}$—Clever 1985/Piao 2003), when the disclosed ratio range of CaS and TNaP is properly blended and applied to the mercury contaminated material in a sufficient amount in view of the mercury content of the soil. The phosphate provided by the present invention's use of TNaP reacts with the calcium supplied by the calcium sulfide (and available calcium that may already be within the waste material being treated) so that such calcium is not free to compete with mercury for the sulfide. Other conventional phosphate-supplying reagents provide calcium to the reaction process, thus providing more unfavorable competition to mercury for the sulfide. With the present invention, the phosphate is provided with sodium, and not calcium, and sodium does not compete for free sulfide or phosphate.

Water can be added to the material being treated in order to enhance contact of the sulfide reactant with mercury, facilitate mixing, lubricate waste particles to improve reagent dispersion throughout the target matrix, increase the mobility of leachable mercury forms to better react with the sulfide, control dust, and/or to activate TNaP to its soluble alkaline condition. Water addition requirements are primarily a function of the characteristics of the material to be treated. Extremely dry material will require more water, and fully saturated sediments or slurries, for example, may not require any water to be added. For typical soils, a moisture range of 5-12% is ideal and water should be added to achieve this minimal range. For excessively wet and saturated materials such as sludges, slurries, and sediments, facilities should be designed to stage treated material for containment purposes and to allow it to drain and dry. In a severe-case high level water content situation, the waste material could be dewatered prior to, or after, treatment using gravity or mechanical dewatering means. In such cases, treatability studies performed by those skilled in the art will help optimize reagent dosing and assess process cost with respect to where and how operational dewatering would be most economically and productively performed.

In all processing cases, excess water beyond what is needed for the mercury-sulfide reactions to proceed can unnecessarily dilute the reactants relative to the density of the waste material (and thus the mercury concentrations), and could potentially compromise the leachability of mercury from the end product. Excess water will also increase the mass of the treated end-product (and increase the cost of handling the end product) as well as create free-liquids that are regulated with respect to material disposal at licensed landfill facilities, making management and handling of the treated material difficult and problematic. Conversely, providing too little water will prevent the reagents from adequately reacting to form mercury of reduced leachability; TNaP may not be adequately dissolved and alkaline conditions not properly adjusted; calcium may not be removed, and the desired reaction between free sulfide and mercury is thwarted; the mercury sulfide in the end-product may not precipitate out sufficiently within the contaminated material; or a combination of these or other unforeseen effects may compromise the desired results.

Another benefit of the present invention is that water is not incorporated into the waste material mass via cementitious, hydration, or pozzolanic reactions. As such, excess water is free to leave the treated mass by gravity drainage, mechanical agitation, centrifugation, evaporation, capillary drying, or other physical means. This is of great importance to large-scale environmental cleanup and remediation projects where the treated end-product must be transported offsite and disposed of on a unit cost per disposed ton basis.

When a liquid solution of slurried CaS and TNaP is desired for the treatment process application, calculated masses of each component can be added to a mixing container or tank, and makeup water added to prepare the desired reagent solution concentration. Heterogeneous mixing and suspension of the reagents with the water can be achieved by spindle, paddle, or other suitable mixers in the tank, or by pump recirculation. The pump can also be used to deliver the reagent fluid to the waste in a waste-reagent mixer based on predetermined dose requirements for batch mixing, or flow rates based on continuous mixer waste feed rates.

In another highly effective reagent delivery method, dry reagents can be added at the proper ratio to the mixer via gravity feed from silos or elevated super sacks. Reagent addition rates can be controlled via weigh cells integrated with off-loading silo augers or conveyor belts. Super sacks can be held with a front-end loader or excavator equipped with a suspended scale system, load-cell, or integrated with the equipment bucket hydraulics. In a very simplistic delivery method, prepackaged bags of reagents of known mass can be added to the mixer manually. With these types of reagent deliveries to the waste and mixer, water is added, preferably in the form of mutually beneficial misting sprays that also mitigate dust from the contaminated material and reagent during treatment blending and mixing operations.

Further, and because the disclosed technology does not cause or generate hydration reactions as would Portland cement or other such additives, process reactions do not generate heat that would cause unsafe and toxic releases of mercury vapor.

In the preferred embodiment, CaS and TNaP are supplied in a nominal 1:1 ratio to each other on a dry weight mass basis. Each reagent can be added directly to the target waste individually, or in a combined blend. Each reagent or the combined blend of the two solids may be put into a slurry or solution mixture form with water for that slurry or solution mixture to be added to the waste material. Water may be added to facilitate dissolution of the reactants in the reagent blend as a slurry, but at a dose that also meets the minimal need for the blending and reaction of the reagent blend's reactants with the mercury in the contaminated material.

With respect to the dose rate or amount of each reagent, it is disclosed that a dose of 0.2% to 2.5% for each is a preferred application, with a combined dose of 0.4 to 5% on a 1:1 reagent blend weight to targeted waste weight.

The 1:1 ratio of CaS:TNaP may be varied to accommodate waste material chemistry and more broadly can range from 2:1 or 1:2, with the most effective ratio to be determined on a case-by-case basis in view of the waste being treated. This ratio is highly important for controlling pH and excess sulfide conditions to prevent formation of soluble mercury sulfide forms at elevated pH, but also in acidic conditions common to landfill leachate. One skilled in the art of performing treatability studies will be able to identify the optimized reaction process within the prescribed reactant dosage ranges individually and as a blend to the specific waste or solid material.

The ratio of 0.4% to 5% of a CaS-TNaP reagent blend to target material to be treated is an appropriate reagent blend, although a full dose rate of 0.4 to 1.5 or 2% by weight is preferred, as this will minimize reagent cost, and treated end-product mass that may require subsequent transportation and disposal on a unit cost mass basis. In severe cases where the contaminated material contains extremely high levels of mercury (e.g., 50 to 150 g/Kg or higher), one may need to add sulfide in a molar amount greater than indicated by the stoichiometry of equations (1) and (2). This is particularly the case where the mercury is dispersed heterogeneously throughout the matrix of the material being treated. Such cases may require a higher dose of the reagent blend to the material, and the ratio of CaS:TNaP may also require adjustment. In general, a 1:1 ratio of CaS:TNaP should be considered a theoretical minimum.

The disclosed process will aggressively react with mercury to form mercury sulfide, which has an extremely low solubility product. As reported in various technical publications and literature, the $K_{sp}$ of Mercury (II) sulfide is widely accepted to be $6.44 \times 10^{-53}$, indicating that it is highly insoluble in water. While the solubility product constant of a compound is not always predictive of the insolubility or leachability of that compound in acidic fluids, such as those used to evaluate waste for disposal, it does suggest the HgS is extremely stable and resistant to disassociation, and that the reaction will proceed to the desired end-product quickly.

To further ensure that the reagent system contacts mercury in the material being treated, robust physical mixing of the waste with the reagents and water is employed. High shear mixing in a batch mixing chamber is preferred where mixing intensity and retention time during mixing will enhance treatment results. Not only will reactants and mercury be more apt to be put in close contact with each other, but the particles of the waste coupled with the mechanics of the mixing blade shear cause elemental mercury droplets to break apart into units of higher surface area, increasing the droplets' reactivity. Droplets of elemental mercury are highly mobile as a result of gravity and mechanical forces. The grinding of waste particles and abrasion caused by aggressive mixing will serve to break up mercury droplets while keeping them uniformly suspended within the waste mass for reaction. Without high shear or robust mixing, mercury droplets could settle out of the waste mass and/or potentially agglomerate into larger extremely dense droplets, even to the point of a recoverable free liquid. In such conditions, mercury within the droplets might not adequately react with CaS and TNaP reagents, and settled mercury would fall outside of the physical reach of mixer paddles, preventing robust mixing. With mixing, the combined surface area of the droplets increases, thus increasing the ability for mercury-reagent contact and reaction. The robust mixing requirement for the technology is best performed in a batch process where the mixing shaft, paddles and blades are controllable with respect to the rate and direction of rotation, and overall retention within the mixing chamber. Reversal of the mixing shaft assembly will allow for prolonged mixing that may require up to 15-20 minutes for adequate mercury-to-reagent contact for the desired reaction to proceed to a desired end-point.

Other continuous feed-discharge type mixers such as pugmills or brick mixers may also be adequate to achieve desired mixing requirements; however such equipment tends to offer process operators less flexibility to accommodate waste material properties and process reactions variables. Batch mixers are also more capable of handling high water content in the material being treated. As water content increases, the reactants are more likely to permeate various particles of waste and debris carrying with it the reactants to contact with mercury. Batch mixers are designed to handle higher water/fluid content materials than pugmills or continuous flow-through mixing units. Crushed concrete and bricks are prime examples of target material that may contain mercury within its interstitial spaces, where higher water content and increased mixing time will improve the treatment of mercury within. When such debris types or particle sizes are encountered, the applicator of the technology may choose to pre-screen the material to remove larger objects that might damage the mixing equipment, as well as any oversized materials not conducive to reagent penetration.

It is well known that elemental mercury droplets are heterogeneous throughout soil-like waste, given its fluid nature, high density, and ability to combine into large globules, or to break-down to nearly invisible droplets. Mixing is essential to enhance the uniformity of mercury throughout the waste and replicate the uniformity of reagent dispersion through the matrix. Simple, single-pass-through mixing equipment may not provide adequate mixing needed to achieve the desired remediation.

In another delivery and mixing method, rotating augers and cutter heads may be used to vertically mix technology reagents in vertical soil columns from the ground surface down to the bottom elevation of the contaminated soil vertical limits. Overlapping columns (secant) will produce the most uniformly mixed material horizontally across a project site, with reagents delivered down the drill or Kelly shaft and outward to the mixing blades from the vertical shaft center line to the extent of their outer diameter cutting and mixing path. Such in situ mixing equipment is designed to deliver reagents and mix them with materials to be processed. The disclosed technology reagents and reaction chemistry are well suited for in situ application to mercury contaminated material using this common type of construction equipment, provided however, that subsurface obstructions and anomalies are identified and managed prior to the start of treatment or when encountered.

An additional benefit of the binary reagent system provided by the invention is that it is well suited for blending and packaging for use in the emergency cleanup of elemental mercury spills.

Examples and Comparative Studies

A number of experiments were carried out to demonstrate the effectiveness of the disclosed CaS/TNaP reagent system for remediating mercury in various samples, and to compare the leachability performance of the invention with prior art methods described in the literature. The results are summarized below in Tables 2-4. The treatability studies performed for the examples provided in this specification were performed on sample matrices obtained from site material samples. All materials were collected as grab samples and mixed as they were added into new and clean 5-gallon buckets. At the lab, buckets were remixed prior to each subsampling removal of material aliquots for treatment application. The sample from the former retort facility was obtained from archival material, but analyzed at the time of the study to assure the characterization data was current From the mixed sample bucket, 100 to 300 g of sample matrix was placed into clean, labeled, and tared glass laboratory beakers using a top-load analytical balance sensitive to +/− 0.1 g. Reagents were added at the desired mass into decontaminated beakers and mixed for each treatment regime. Water was added in similar fashion to facilitate mixing, taking care to avoid free liquids, and to aid in the dispersion of the reagents throughout the sample mass. Mixing was accomplished with a decontaminated stainless steel spatula using both folding and rigorous knifing action to achieve apparent homogeneity. Particular intention to thorough mixing was paid when elemental mercury droplets were evident within the matrix. Mixing was performed for a typical period of 5-10 minutes to replicate field equipment performance. Upon mixing completion, treatment reactions were allowed to proceed for approximately 1-3 hours prior to subsampling and placement into containers for analysis by the third party laboratory, Edge Analytical, Inc. of Burlington, Wash.

For larger pilot study work, base sample matrix was obtained from a batch grout mixer at the site. Larger 1-2 Kg samples were then subsampled as per above instead of the 100-300 g sample aliquots.

TABLE 2

Examples 1A and 1B
Former Mercury Retort/Heavy Metal Recovery Site

| Data/Treatment | Untreated Soil | Example 1A | Example 1B |
| --- | --- | --- | --- |
| Total Hg (mg/Kg) | 1080 | | |
| TCLP Hg (mg/L) | 11.35 | 33.35 | 0.010/0.0185 |
| pH (S.U.) | 8.55 | 10.21 | 9.59 |
| CaS Dose (%) | — | 1.5 | 0.78% |
| TNaP | — | 1.5 | 0.78% |
| Water Dose (%) | — | 8% | 8% |

Reagent Dose Rates = Dry wt. reagent percent to soil as sampled
TNaP = Trisodium phosphate
Data by Edge Analytical, Inc., Burlington, WA
USEPA Analytical Methods (7471A, 1311, 9045D)

Examples 1A and 1B illustrate the application of the disclosed reagents and their respective dosages to soil from a former mercury retort and heavy metal recovery remediation site using the preferred 1:1 ratio of reagents to each other along with water addition to the contaminated soil. In Example 1A, however, the combined reagent dose applied to the soil was 3%, nearly twice that of Example 1B. This resulted in an increased amount of leachable mercury from the untreated level. In Example 1B, the reagent blend, the blend dose to the contaminated material, and the water addition clearly identify the preferred embodiment as also supported by the duplicate analysis of the treated end-product. Noteworthy is the pH differential between Example 1A and Example 1B samples. The pH of Example 1A pH is 10.21—more than half a standard unit above that of Example 1B. In addition, the amount of sulfide used in Example 1A is nearly twice as much as in Example 1B. The results for Example 1A are consistent with the problem of increased mercury solubility resulting from the use of excess sulfide in overly alkaline conditions due to the common ion effect, as referenced in the prior art. The pH of Example 1B was a result of the controlled addition of the preferred reagent system of this invention assuring that neither excess sulfide nor overly elevated pH conditions were created. It is also noted that the overall mass increase of Example 1B was less than 10%, of which nearly 8% was water that could be lost by dewatering efforts after treatment, and less than 1.6% was sourced from the reagents themselves.

With respect to the calcium sulfide used in the study (Jul. 27, 2018), it was sourced from bulk material that was in storage for over 48 months since its Material Safety Data Sheet (MSDS—Jun. 17, 2014) was prepared and provided with the material at the time of delivery.

Most importantly, the disclosed invention exemplified in Example 1B and evaluated by U.S. EPA approved test and analytical methods met the RCRA limit for characteristically hazardous waste (0.2 mg/L) as well as the U.S. EPA Land Disposal Restriction limit (0.025 mg/L) for treatment of hazardous waste.

ment <0.2 mg/L RCRA limit at total reagent dose to contaminated material of <2%. It is noted that V-4 was a borderline failure. At a 2% reagent-system dose to contaminated material using a reagent ratio of 1:1.05, a pH of 9.97 S.U. resulted. As evidenced with the V-2 and V-3 treatment. TCLP mercury fluctuations were generated that would have likely facilitated a passing result had the ratio been slightly adjusted to favor CaS over TNaP.

It is also noted that the V-4 total reagent-system dose rate of 2% or even higher would be appropriate if total mercury was more elevated, and the mole ratio of available sulfide did not provide adequate sulfide to react with moles of mercury in accordance with the 1:1 mole ratio of the $Hg+S^{-2} \rightarrow HgS$ reaction. With the present invention, the ratio

TABLE 3

Viability Treatment Results: Comparing the Invention to the Prior Art
Chlor-Alkali Mercury Cell Site Soil - Viability Study Comparison

| Sample ID | Total Hg (mg/Kg) | TCLP Hg (mg/L) | pH (S.U.) | Reagent-System (% wt. to Soil) | Total Dose (%) | Total No. of Reagents | 0.2 mg/L RCRA Limit (Pass/Fail) |
|---|---|---|---|---|---|---|---|
| Untreated | 16,863 | 1.94 | 6.50 | none | — | — | Fail |
| V-1 | | 0.099 | NR | CaS: 0.786% TNaP: 0.798% | 1.58 | 2 | Pass |
| V-2 | | 0.117 | 9.61 | CaS: 0.77% TNaP: 0.55% | 1.32 | 2 | Pass |
| V-3 | | 0.140 | 9.81 | CaS: 0.51% TNaP: 0.87% | 1.38 | 2 | Pass |
| V-4 | | 0.209 | 9.97 | CaS: 1% TNaP: 1% | 2 | 2 | Borderline |
| V-5 | | 0.0581 | 12.44 | CaS: 7.97% Ca(OH)$_2$: 6.93% H$_3$PO$_4$: 0.75% | 15.65 | 3 | Pass |
| V-6 | | 0.0521 | NR | CaS: 6 Ca(OH)$_2$: 6% CaCO3: 3% H$_3$PO$_4$: 0.78% | 15.78 | 4 | Pass |
| V-7 | | 1.34 | 12.30 | CaS: 6% Ca(OH)$_2$: 5.5% H$_3$PO$_4$: 0.73% | 12.2 | 3 | Fail |
| V-8 | | 8.26 | 8.10 | CaS: 0.1% CPS: 0.8 TNaP: 0.3% | 1.2 | 3 | Fail |
| V-9 | | 2.18 | 8.40 | CPS: 0.6% Ca(OH)$_2$: 1.2% | 1.8 | 2 | Fail |
| V-10 | | 2.77 | 9.33 | CPS: 1% Ca(OH)$_2$: 0.2% | 1.2 | 2 | Fail |

CaS: Calcium Sulfide
TNaP: Trisodium phosphate
Ca(OH)$_2$: Calcium hydroxide
CPS: Calcium polysulfide
H$_3$PO$_4$: Phosphoric Acid
NR - no result
Data by Edge Analytical, Inc., Burlington, WA
USEPA Analytical Methods (7471A, 1311, 9045D)

Table 3 presents viability treatment study results using the described invention (V-1 through V-4) and other reagent-systems derived from the literature and prior art (V-5 through V-10). The data show that the present invention providing calcium sulfide and trisodium phosphate resulted in the treatment of leachable mercury to below the RCRA toxicity limit for hazardous waste. Regime V-1 followed a near 1:1 reagent ratio of 1:1.05 (CaS:TNaP), with V-2 and V-3 reagent ratio's inversed to each other at 1.4:1, and 1.71:1, respectively. One skilled in the art will know that these ratios can be flexible, but dependent upon the chemistry of a specific contaminated material, the level and type of leachable mercury present, etc. For the contaminated material treated in this study, the reagent ratio range of 1:1.4 to 1.7:1 was adequate to achieve the TCLP mercury treatof reagents in the reagent-system can be adjusted to control the pH of the material during treatment so that that excess sulfide does not cause an increase in mercury leachability as a result of an overly alkaline pH. As previously mentioned, the chemical characteristics of the contaminated material will have a direct impact on pH changes as a result of the ratio of reagents in the reagent-system, and one skilled in the art will ascertain whether the pH of the processing during treatment is too elevated as identified during treatability process optimization studies, or if additional sulfide is required to accommodate the level of mercury present in the contaminated material.

Treatment regimens V-5 through V-8 provided more three (3) or more reagents to treat leachable mercury as learned from prior art and the literature. These reagents were selected from the list of: calcium sulfide, calcium hydroxide, calcium carbonate, and phosphoric acid. While V-5 and V-6 both resulted in passing TCLP mercury results, V-7 and V-8 failed to achieve the treatment objective. V-5 and V-6 both contributed over 15% of the contaminated material mass in reagent weight to the final end-product. If applied at full-scale, both of these system would have increased treated material transportation and off-site disposal costs by this amount as well. Further, the additional reagent delivery, handling, dosing and mixing, and the final mass of the end-product would have other related cost increases, such as the time and cost to load transport vehicles, unlike the reagent-system of this invention. In the event these regimes were to be applied to soil using in situ delivery and mixing means, substantial soil expansion would result from treatment, causing major civil engineering implications and costly management requirements for the increased mass of material in situations where treated material would be left onsite, or excavated and subsequently managed.

It is also noted that V-7 had the same general treatment reagent-system applied as V-6, but without calcium carbonate. The data illustrates the need for this fourth reagent as provided in V-6 where TCLP mercury met the treatment limit, and V-7 was over twenty-five (25) times the V-6 result, and almost seven (7) time the EPA RCRA limit of 0.2 mg/L for mercury in TCLP extract. While the contaminated material mass would increase to a lesser degree than V-5 or V-6, V-5 would still have similar cost implications as discussed above with a mass increase of over 12%.

Treatment V-8 provided a three (3) reagent-system consisting of calcium sulfide, calcium polysulfide, and trisodium phosphate at very low individual reagent doses in a ratio of approximately 8:1:0.375, respectively, with a total reagent-system dose to contaminated material of 1.2%. In theory, the sulfide provided by the calcium sulfide, and the calcium polysulfide would be adequate for formation of mercury sulfide at the near neutral pH of 8.26 S.U. as suggested in V-1 through V-3. Conversely, the increased amount of calcium provided by these two reagents of the system was either consumed by the limited amount of phosphate added, and the remaining sulfide was not fully released, or the sulfide was converted to non-reactive sulfate, sulfur and sulfite species as a result of oxidation/reduction reactions within the system. Further study is needed to examine this result, but regardless, this reagent-system utilized three (reactants) at a low dose, and failed to yield the desired treatment limit.

Reagent-systems V-9 and V-10 provided calcium polysulfide with calcium hydroxide to evaluate the efficacy of this system without phosphate and at a total reagent dose rate of <2%. While TCLP mercury results of 2.18 and 2.77 mg/L at pH levels of 8.40, and 9.33 S.U., respectively, were lower than the result of V-8, V-09 and V-10 both still failed to achieve the RCRA limit for leachable mercury, even with a reduced dose of sulfide provided by the system in moderately alkaline pH conditions. It is likely that the level of calcium provided by the applied reagent-system could be part of the cause. Regardless, and in consideration of the results, the present invention binary reagent system of calcium sulfide and trisodium phosphate met the treatment objective for leachable mercury, while reagents, reagent combinations, controlled pH, and competitive dose rates identified in prior art did not.

In a less preferable embodiment, calcium sulfide can be replaced with calcium polysulfide (lime sulfur; $CaS_x$; "CPS"). While the process may still perform as intended with proper control, CPS contains higher quantities of non-sulfide sulfur constituents such as sulfates and sulfites, and the reactive sulfide is in a less concentrated form than calcium sulfide. Further, and because of the need for additional sulfide due to the presence of undesirable sulfur forms and the elevated pH of the reactant, the common ion effect described by Clever (1985), U.S. EPA (1997), and Piao (2003) from overly elevated alkaline pH conditions cause mercury solubility issues. When more sulfide is required to adequately react with mercury, the increased dosing of CPS will also increase the pH of the contaminated material without the ability to control it with just CPS. An additional acidifying reagent would then be required to neutralize alkaline pH conditions, increasing the risk of generating hydrogen sulfide gas.

TABLE 4

Comparative Examples: A Calcium Polysulfide Reagent System
Former Chlor-Alkali Mercury Cell Site Soil - Pilot Scale

| Treatment Regime | CPS (%) | TNaP (%) | Ca(OH)$_2$ (%) | H$_3$PO$_4$ % | Total Dose (%) | Total Hg (mg/Kg) | TCLP Hg (mg/L) | 0.2 mg/L (Pass/Fail) |
|---|---|---|---|---|---|---|---|---|
| Untreated | | | | | | 13,566 | 2.06 | Fail |
| CPS-1 | 1 | 1 | | | 2 | | 0.0679 | Pass |
| CPS-2 | 1 | 1 | | | 2 | | 3.22 | Fail |
| CPS-3 | 1 | | 0.40 | | 1.4 | | 8.28 | Fail |
| CPS-4 | 1 | 0.24 | | | 1.24 | | 11.2 | Fail |
| CPS-5 | 2 | | | | 2 | | 0.281 | Fail |
| CP5-6 | 2 | | | | 2 | | 12.1 | Fail |
| CPS-7 | 2.9 | | | | 2.9 | | 2.00 | Fail |
| CP5-8 | 3.3 | | | 1.3 | 4.60 | | 1.74 | Fail |

CPS: Calcium polysulfide
TNaP: Trisodium phosphate
Ca(OH)$_2$: Calcium hydroxide
H$_3$PO$_4$: Phosphoric Acid
Data by Edge Analytical, Inc., Burlington, WA
USEPA Analytical Methods (7471A, 1311, 9045D)

Examples CPS-1 to CPS-8 illustrate the use of a calcium polysulfide (CPS)-based reagent system for soil containing elemental mercury obtained from a former chlor-alkali mercury cell soil site. While CPS-1, which included trisodium phosphate and calcium polysulfide at a total reagent dose of 2%, achieved passing TCLP mercury results, the duplicate sample from the same treatment failed. All other CPS-based examples also failed. The failure of the replicate sample of this treatment regimen suggests that CPS does not provide necessary consistent results. Consideration of varying dosages of CPS and with calcium hydroxide and phosphoric acid was attempted to provide more continuity with a CPS-phosphate system for this specific contaminated material based upon pH of the end-product. Results show that mercury leachability was increased as a result. Collectively, the data shows the inconsistency of results and unreliability of using a calcium polysulfide/trisodium phosphate reagent system, as opposed to the calcium sulfide/trisodium phosphate reagent system of the present invention.

Upon reading this disclosure, other embodiments and modifications may be apparent to the skilled person. For example, in an alternate embodiment, the calcium sulfide (CaS) in the described binary reagent system may be replaced with sodium sulfide ($Na_2S$), with the amount of TNaP adjusted as needed for pH control and to account for any calcium that may be present in the host contaminated material. The present invention is limited only by the appended claims and equivalents thereof.

What is claimed is:

1. A method of treating mercury-contaminated material to obtain a treated product having reduced mercury leachability, comprising:
    admixing the mercury-contaminated material with a reagent system comprising calcium sulfide (CaS) and trisodium phosphate (TNaP), wherein the calcium sulfide and trisodium phosphate are provided at a CaS:TNaP ratio of from 2:1 to 1:2, on a dry weight reagent basis, and the reagent system is provided in an amount equal to 0.4% to 1% by weight of the contaminated material; and
    adding water as needed to achieve a moisture content of at least 5% by weight of the contaminated material.

2. The method of claim 1, wherein the mercury-contaminated material is provided as a dry solid.

3. The method of claim 1, wherein the mercury-contaminated material is provided as a moist solid having a moisture content of up to 60% by weight.

4. The method of claim 1, wherein the mercury-contaminated material is provided as a sediment, sludge or slurry having a solids content of at least 5% by weight.

5. The method of claim 1, wherein the mercury-contaminated material comprises soil.

6. The method of claim 1, wherein the reagent system is provided to the contaminated material as a blend of calcium sulfide and trisodium phosphate.

7. The method of claim 1, wherein the reagent system is provided as an aqueous slurry.

8. The method of claim 7, wherein the aqueous slurry imparts the water needed to achieve a moisture content of at least 5% by weight.

9. The method of claim 1, wherein the reagent system is provided on a component-by-component basis, with the calcium sulfide added separately from the trisodium phosphate.

10. The method of claim 1, wherein the CaS:TNaP ratio is 1:1.

11. The method of claim 1, further comprising the step of dewatering the treated product.

12. The method of claim 11, wherein the step of dewatering is selected from the group consisting of draining, decanting, mechanical agitation, centrifugation, filtering, evaporation, capillary drying, and combinations thereof.

13. The method of claim 1, wherein the mercury-contaminated material contains elemental mercury.

14. The method of claim 1, wherein the mercury-contaminated material contains mercury in ionic form.

15. The method of claim 1, wherein the mercury-contaminated material contains at least one organo-mercury compound.

16. The method of claim 1, wherein the amount of CaS reagent is minimized to avoid formation of soluble mercury species that form via a common ion effect.

17. The method of claim 1, wherein subjecting the treated product to a mercury toxicity characteristic leaching test (TCLP) yields an extract that contains less than 0.2 mg/L of mercury, as determined by Test Method 1311, US EPA SW-846 and analysis of mercury in the extract.

18. The method of claim 1, wherein subjecting the treated product to a mercury toxicity characteristic leaching test (TCLP) yields an extract that contains less than 0.025 mg/L of mercury, as determined by Test Method 1311, US EPA SW-846 and analysis of mercury in the extract.

19. A method of treating mercury-contaminated material to obtain a treated product having reduced mercury leachability, comprising:
    admixing the mercury-contaminated material with a reagent system consisting essentially of calcium sulfide (CaS) and trisodium phosphate (TNaP), wherein the calcium sulfide and trisodium phosphate are provided at a CaS:TNaP ratio of from 2:1 to 1:2, on a dry weight reagent basis, and the reagent system is provided in an amount equal to 0.4% to 1% by weight of the contaminated material; and
    adding water as needed to achieve a moisture content of at least 5% by weight of the contaminated material.

20. The method of claim 19, wherein the mercury-contaminated material contains mercury selected from the group consisting of elemental mercury, mercury-containing ions, and organo-mercury compounds.

21. The method of claim 19, further comprising the step of dewatering the treated product.

* * * * *